No. 658,927. Patented Oct. 2, 1900.
H. N. RIDGWAY.
AQUATIC COURSE.
(Application filed May 5, 1899.)
(No Model.)

Witnesses:
Fred S. Greenleaf.
Adolf C. Kaiser.

Inventor
Herbert N. Ridgway
By Crosby & Gregory
Attys

UNITED STATES PATENT OFFICE.

HERBERT N. RIDGWAY, OF WINTHROP, MASSACHUSETTS.

AQUATIC COURSE.

SPECIFICATION forming part of Letters Patent No. 658,927, dated October 2, 1900.

Application filed May 5, 1899. Serial No. 715,663. (No model.)

*To all whom it may concern:*

Be it known that I, HERBERT N. RIDGWAY, of Winthrop, county of Suffolk, State of Massachusetts, have invented an Improvement in Aquatic Courses, of which the following description, in connection with the accompanying drawings, is a specification, like letters on the drawings representing like parts.

This invention has for its object the production of an aquatic course for pleasure and other resorts.

My invention consists of a water retainer or reservoir, a series of boats, and an actuator for said boats, said actuator causing the said boats to travel or take a voyage in a prescribed path, and preferably when starting said boats will leave a landing and take a position at a distance from the landing in the field of water, and the boats will thereafter travel in their prescribed course until the voyage has been completed, when said boats will leave the portion of the field of water in which they moved during their voyage and come to the landing to enable the passengers to disembark. The water retainer or reservoir may be composed of a large wooden or other wall, having a bottom of wood or any other suitable material, or it may be a cement bottom, and the water let into this retainer or reservoir will be made to float the boats. The landing may be a part of the ground or floor surrounding the open top of the retainer or reservoir, and preferably the level of the water in the said reservoir will be nearly up to the top of its retaining side wall. To move these boats and cause them to take what may be designated as a "voyage" on the adjacent water-field, I provide, preferably centrally in the retainer or reservoir, a circularly-movable or traveling driver having in the form in which I have herein chosen to illustrate one practical embodiment of my invention a series of crank-pins, on which I have pivoted a series of arms connected each at its free end operatively with a boat forward of the center of its length. The driver and arms constitute what I shall hereinafter at times designate as an "actuator" or "actuating means" for the boats. The driver has a series of stops, one for each arm, said stops acting against the arms between their pivotal points on the driver and their free ends while the boats are traveling in their voyage.

Figure 1:
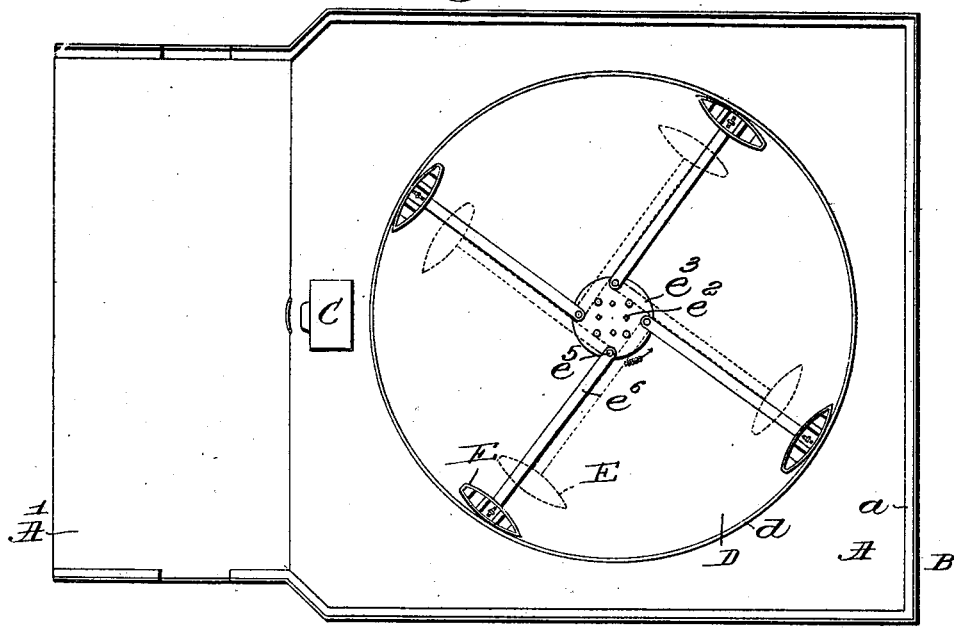
Figure 1:
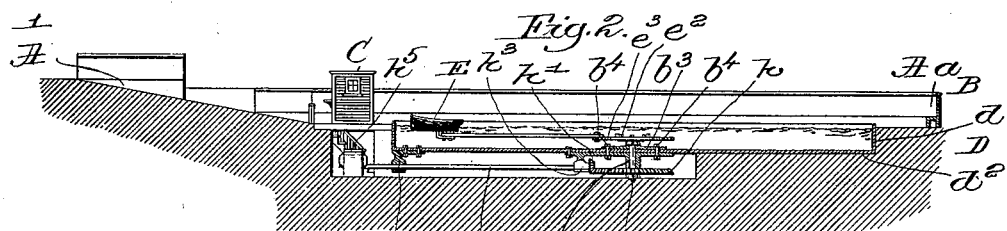
Figure 1:
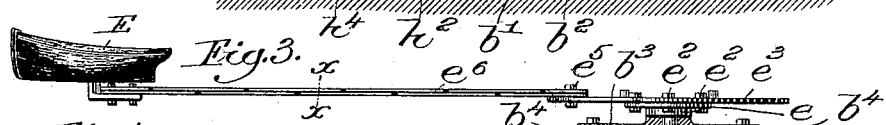
Figure 1:
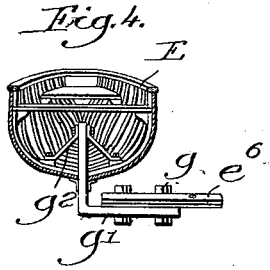
Figure 1:
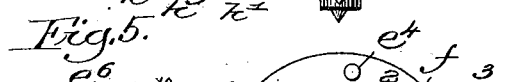

Figure 1 represents part, it may be supposed, of a lot of land with a retainer or reservoir therein and boats contained in said reservoir together with their actuating devices. Fig. 2 is a sectional elevation showing part of the ground with the retainer or reservoir and actuating mechanism, the boat floating in the water. Fig. 3 is an enlarged detail of a boat, a driver, and connected arm. Fig. 4 is a yet larger detail showing one form of connecting-arm and boat. Fig. 5 represents one of the arms in section in the line $x$, Fig. 3. Fig. 6 represents the upper plate or disk of the driver enlarged.

Let it be supposed that A represents a plat of ground inclosed by a suitable fence or barricade, as B, having, it may be, a row of seats at $a$. A suitable ticket-office may be located at C in the entrance A'. Inside this plat of ground I provide the retainer or reservoir D, it being shown as having an upright wall $d$ and a bottom $d^2$, the shape of said reservoir being preferably circular, and the water therein will preferably stand at the depth of about two or three feet, the water being just deep enough to float the boats E when they have received the maximum weight, measured by the number of people who will be permitted to enter a boat. I have herein shown four of these boats; but I may use any desired number, according to the size of the reservoir, and the reservoir might have a plurality of series of boats with actuating mechanism. The bottom piece $d^2$ of the reservoir is herein shown as having applied to it, substantially at its center and externally thereto, a stand $b$, through which is extended a suitable shaft $b'$, said shaft having its lower end stepped in a suitable step or bearing $b^2$. This shaft is extended up into the reservoir and through a stay-plate $b^3$, said stay-plate and the flanged part of the stand $b$ being united by suitable rivets or bolts $b^4$. The shaft $b'$ at a point above the plate $b^3$ has applied to it by a suitable set-screw a hub $e$, having a flange, and to this flange, it having suitable holes, I have connected by suitable stud-screws $e^2$ (shown as four in number) a disk or plate $e^3$. This disk or plate has a series of holes $e^4$, (shown in Fig. 6,) which receive stud-screws $e^5$, one of which is represented in Fig. 3, said stud-screws receiving over them and under their heads the ends of arms $e^6$, said arms being loosely mounted on said stud-screws, which constitute crank-pins, the outer ends of said arms being connected, as will be hereinafter described, each with a boat, as E. The disk $e^3$ has a series of stops $f$, one for each stud-screw, carrying an arm $e^6$, so that when the shaft $b'$ is rotated in the direction of the arrow in Fig. 1 the stops will strike each arm at a short distance from its pivotal point on the stud-screw $e^5$.

As herein represented, the connection between the arm $e^6$ and the boat is made by bolts $g$, extended through the arm and through an L-shaped beam $g'$, represented as extended up through the bottom of the boat, as in Fig. 4, the top of said arm being braced inside the boat by suitable braces $g^2$. Any other desired means of connecting the boat with the arm may be employed instead of the particular connection herein shown, and so, also, this invention is not limited to the particular arm shown or to the particular shape of the arm.

The shaft $b'$ has attached to it outside the reservoir a large bevel-toothed wheel $h$, which is engaged by a beveled pinion $h'$, fast on a shaft $h^2$, supported in suitable bearings $h^3$ and $h^4$. The outer end of this shaft is extended beyond the wall constituting the periphery of the reservoir and has applied to it a suitable electric or other motor, which is accessible by stairs $h^5$ from within the ticket-house C, so that the motor, as well as the actuating mechanism for moving the boats, is concealed from view. The arms $e^6$ will be made of wood, because its specific gravity is less than metal, and to enable the wooden arms to resist the strain of driving the boats and also so that their resistance in moving through the water may be decreased said arms may be reinforced by a V-shaped metallic edge $e^{10}$.

When the apparatus is at rest, the boats will stand at the landing, as shown by full lines.

As the driver is started in motion in the direction of the arrow the boats lying at the landing will, owing to the resistance offered by the water, lag behind the driver, and as the ends of the arms connected with the driver continue to move the boats will be drawn away from the landing into the field of water, and as soon as the stops meet the arms between their pivotal points and the boats said arms will be moved uniformly with the driver, and when the driver is stopped the momentum of the boats will cause them to continue to move until the boats again arrive close to the landing.

Having fully described my invention, what I claim, and desire to secure by Letters Patent, is—

1. A retainer or reservoir, a circularly-movable driver, a series of arms pivoted thereto to swing in a substantially-horizontal plane, boats engaged by said arms, and means to move said driver when desired, substantially as described.

2. A retainer or reservoir, a surrounding landing, a series of boats lying when stopped at said landing, a circularly-movable driver, an arm connecting each of said boats with the driver, said arms being pivoted to the driver to swing in a substantially-horizontal plane, whereby said boats are moved laterally from said landing when the driver is started and thereafter moved in a prescribed path on the body of the field of water, said boats approaching said landing when the driver is stopped.

3. A retainer or reservoir, a surrounding landing, a series of boats, a circularly-moving driver, a series of arms pivoted on said driver and connected with said boats, and stops carried by said driver, substantially as described.

4. A retainer or reservoir for water, a circularly-movable driver, a series of arms connected therewith to swing in a substantially-horizontal plane, boats engaged by said arms, the said driver and arms being located entirely below the plane of the top of the retainer or reservoir and bottom of the boats whereby when the latter is filled with water the driver and arms are concealed below the water-surface, substantially as described.

5. A retainer or reservoir, a surrounding landing, a series of boats, a circular movable driver, and a series of connections between said driver and said boats and movable with respect to the driver to draw the boats inwardly toward the center of the reservoir when the driver is started, the boats when the driver is stopped moving independently of the driver outwardly toward the landing.

In testimony whereof I have signed my name to this specification in the presence of two subscribing witnesses.

HERBERT N. RIDGWAY.

Witnesses:
GEO. W. GREGORY,
CHARLES L. RIDGWAY.